United States Patent
Tanaka et al.

(10) Patent No.: US 9,079,214 B2
(45) Date of Patent: *Jul. 14, 2015

(54) METHOD OF PRODUCING MAGNESIUM FLUORIDE COATING, ANTIREFLECTION COATING, AND OPTICAL ELEMENT

(71) Applicant: CANON KABUSHIKI KAISHA, Tokyo (JP)

(72) Inventors: Hiroyuki Tanaka, Kawasaki (JP); Motokazu Kobayashi, Yokohama (JP); Teigo Sakakibara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 202 days.

This patent is subject to a terminal disclaimer.

(21) Appl. No.: 13/770,890

(22) Filed: Feb. 19, 2013

(65) Prior Publication Data

US 2013/0156973 A1 Jun. 20, 2013

Related U.S. Application Data

(63) Continuation of application No. 12/843,687, filed on Jul. 26, 2010, now Pat. No. 8,399,069.

(30) Foreign Application Priority Data

Jul. 30, 2009 (JP) .................................. 2009-178332

(51) Int. Cl.
*C23C 8/00* (2006.01)
*C23C 10/10* (2006.01)
*C23C 16/24* (2006.01)
*B05D 5/06* (2006.01)
*C03C 17/22* (2006.01)
*C23C 18/08* (2006.01)
*C23C 18/14* (2006.01)
*G02B 1/111* (2015.01)
*G02B 1/113* (2015.01)

(52) U.S. Cl.
CPC ................ *B05D 5/061* (2013.01); *C03C 17/22* (2013.01); *C23C 18/08* (2013.01); *C23C 18/14* (2013.01); *G02B 1/111* (2013.01); *G02B 1/113* (2013.01); *C03C 2217/285* (2013.01); *C03C 2217/732* (2013.01); *C03C 2218/113* (2013.01); *Y10T 428/26* (2015.01)

(58) Field of Classification Search
CPC ............................... C23C 18/08; C23C 18/14
USPC ........................ 427/226, 554, 557, 558, 384
See application file for complete search history.

(56) References Cited

U.S. PATENT DOCUMENTS 4,492,721 A * 1/1985 Joosten et al. ................ 427/226

* cited by examiner

*Primary Examiner* — Michael Wieczorek
(74) *Attorney, Agent, or Firm* — Canon U.S.A. Inc., IP Division

(57) ABSTRACT

A method of producing a magnesium fluoride coating includes a step of forming a coating by applying a solution containing a fluorine-containing organic magnesium compound represented by the following formula to a base and a step of heat-treating the coating while the coating is being irradiated with a beam of light with a wavelength of 246 nm or less:

$$Mg(CF_3—X—COO)_2 \quad (1)$$

wherein X represents a single bond or one of $—(CF_2)_n—$, $—(CH_2)_m—$, and $—CH_2CF_2—$ that may have a substituent, where n and m each represent an integer of 1 to 4. The temperature of the heat-treating step can be 250° C. or lower. The coating can be irradiated with a beam of light with a wavelength of 185 nm or less.

6 Claims, 1 Drawing Sheet

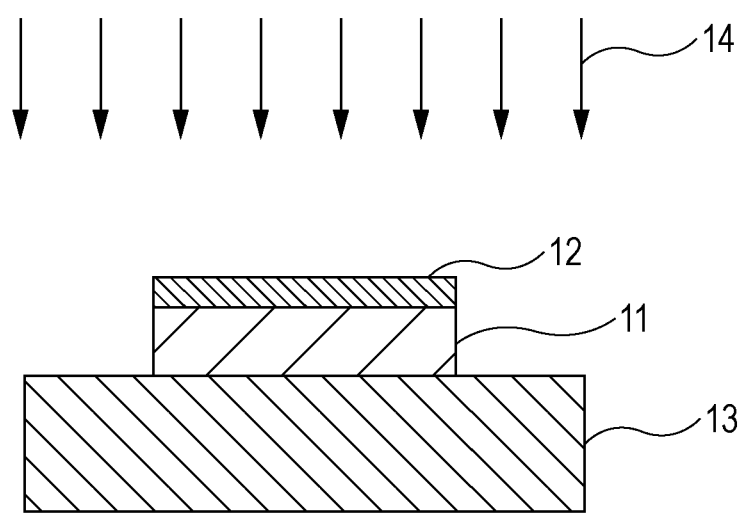

METHOD OF PRODUCING MAGNESIUM FLUORIDE COATING, ANTIREFLECTION COATING, AND OPTICAL ELEMENT

CROSS REFERENCE TO RELATED APPLICATIONS

This application is a Continuation of U.S. patent application Ser. No. 12/843,687 filed Jul. 26, 2010, which claims priority to Japanese Patent Application No. 2009-178332 filed Jul. 30, 2009, each of which are hereby incorporated by reference herein in their entireties.

BACKGROUND OF THE INVENTION

1. Field of the Invention

The present invention relates to a method of producing a magnesium fluoride coating, an antireflection coating having a good antireflection effect and a low refractive index, and an optical element including the antireflection coating.

2. Description of the Related Art

Conventional antireflection coatings for optical elements, such as lenses, required to have an antireflection effect are known to have a multilayer structure formed by alternately depositing a high-refractive index substance such as titanium oxide ($TiO_2$) or zinc oxide ($ZnO_2$) and a low-refractive index substance such as magnesium fluoride ($MgF_2$) by a vacuum vapor deposition process. In particular, layers located on the air side are preferably made of a low-refractive index substance; hence, $MgF_2$, which has a refractive index $n_d$ of 1.38 for light with a wavelength of 587 nm, has been used to form such layers.

Japanese Patent Laid-Open No. 59-213643 discloses a method of producing an $MgF_2$ thin film by a wet process instead of vacuum vapor deposition.

Japanese Patent Laid-Open No. 59-213643 also discloses a method of producing magnesium fluoride by a thermal disproportional reaction. In particular, a fluorine-containing organic magnesium compound or a precursor thereof is applied to a substrate and is then disproportionated by heating, whereby magnesium fluoride is produced.

In this method disclosed in Japanese Patent Laid-Open No. 59-213643, the temperature required to form a magnesium fluoride film by the thermal decomposition or disproportion of the fluorine-containing organic magnesium compound is 300° C. or higher.

When the fluorine-containing organic magnesium compound is magnesium fluorocarboxylate, no $MgF_2$ film can be obtained unless magnesium fluorocarboxylate is heated to a higher temperature in accordance with the increase in molecular weight of a fluorocarboxylic acid used.

In the case of preparing an optical element by forming an $MgF_2$ thin film on a base, the heating of the base to a high temperature for the purpose of forming the $MgF_2$ thin film possibly causes a reduction in dimensional accuracy and will cause significant damage depending on a material used to form the base.

SUMMARY OF THE INVENTION

The present invention has been made in consideration of the background art and provides a method of producing a magnesium fluoride coating which can be obtained by low-temperature heat treatment.

The present invention further provides an antireflection coating which is produced by the magnesium fluoride coating-producing method and which has a high antireflection effect and a low refractive index and also provides an optical element including the antireflection coating.

A method of producing a magnesium fluoride coating according to an embodiment of the present invention includes a step of forming a coating by applying a solution containing a fluorine-containing organic magnesium compound represented by the following formula 1 to a base and a step of heat-treating the coating while the coating is being irradiated with a beam of light with a wavelength of 246 nm or less:

$$Mg(CF_3-X-COO)_2 \quad (1)$$

wherein X represents a single bond or one of $-(CF_2)_n-$, $-(CH_2)_m-$, and $-CH_2CF_2-$ that may have a substituent, where n and m each represent an integer of 1 to 4.

An antireflection coating according an embodiment of to the present invention is produced by the magnesium fluoride coating-producing method and has a refractive index of 1.35 or less at a wavelength of 587 nm. An optical element according to an embodiment of the present invention includes the antireflection coating.

According to the present invention, a method of producing a magnesium fluoride coating which can be obtained by low-temperature heat treatment can be provided. An antireflection coating produced by the magnesium fluoride coating-producing method can be provided. The antireflection coating has a high antireflection effect and a low refractive index. An optical element including the antireflection coating can be provided.

Further features of the present invention will become apparent from the following description of exemplary embodiments with reference to the attached drawing.

BRIEF DESCRIPTION OF THE DRAWING

The FIGURE is a schematic view illustrating an example of a heat-treating step used herein.

DESCRIPTION OF THE EMBODIMENTS

Embodiments of the present invention will now be described in detail.

A method of producing a magnesium fluoride coating according to an embodiment of the present invention includes a step of forming a coating by applying a solution containing a fluorine-containing organic magnesium compound represented by the following formula 1 to a base and a step of heat-treating the coating while the coating is being irradiated with a beam of light with a wavelength of 246 nm or less:

$$Mg(CF_3-X-COO)_2 \quad (1)$$

wherein X represents a single bond or one of $-(CF_2)_n-$, $-(CH_2)_m-$, and $-CH_2CF_2-$ that may have a substituent, where n and m each represent an integer of 1 to 4. Examples of X in the above formula include single bonds, $-CF_2-$, $-(CF_2)_2-$, $-(CF_2)_3-$, $-(CF_2)_4-$, $-CH_2-$, and $-CH_2CF_2-$.

The fluorine-containing organic magnesium compound used herein can be obtained by the reaction of a fluorocarboxylic acid with magnesium or a magnesium compound which is a source of magnesium.

Examples of the magnesium compound include magnesium acetate and magnesium alkoxides.

The fluorocarboxylic acid may have a $CF_3$ group at its terminal and can be a compound represented by the following formula 2:

$$CF_2-X-COOH \quad (2)$$

wherein X represents a single bond or one of —(CF$_2$)$_n$—, —(CH$_2$)$_m$—, and —CH$_2$CF$_2$— that may have a substituent, where n and m each represent an integer of 1 to 4.

Examples of the fluorocarboxylic acid represented by Formula (2) include perfluorocarboxylic acids such as trifluoroacetic acid (CF$_2$COOH), pentafluoropropionic acid (CF$_2$CF$_2$COOH), heptafluorobutyric acid (CF$_2$(CF$_2$)$_2$COOH), nonafluorovaleric acid (CF$_2$(CF$_2$)$_2$COOH), and undecafluorohexanoic acid (CF$_2$(CF$_2$)$_4$COOH) and fluorocarboxylic acids having a substituent.

Examples of the reaction of trifluoroacetic acid, which is an example of the fluorocarboxylic acid, with magnesium or the magnesium compound are as described below:

$$Mg(CH_3COO)_2 + 2CF_3COOH \rightarrow Mg(CF_3COO)_2 + 2CH_3COOH \quad (1)$$

$$Mg(C_2H_5O)_2 + 2CF_3COOH \rightarrow Mg(CF_3COO)_2 + 2C_2H_5OH \quad (2)$$

$$Mg + 2CF_3COOH \rightarrow Mg(CF_3COO)_2 + H_2 \quad (3)$$

Reactions (1) and (2) are equilibrium reactions in solutions and therefore a step of isolating magnesium trifluoroacetate is necessary. In order to produce magnesium trifluoroacetate, Reaction (3), that is, the reaction of metallic magnesium with trifluoroacetic acid can be used.

A coating solution is prepared by dissolving the fluorine-containing organic magnesium compound in an organic solvent and is then applied to a base or an optical element, whereby a coating is formed thereon. Known coating processes can be used to form the coating: for example, a dipping process, a spin coating process, a spraying process, a printing process, a flow coating process, and a combination of some of these processes. The thickness of the coating can be controlled by varying the pulling rate of the base or the optical element in the case of using the dipping process, varying the rotation speed of a substrate in the case of using the spin coating process, or varying the concentration of the coating solution.

The coating thickness is reduced by a factor of about two to ten by a thermal disproportional reaction. The degree of the reduction of the coating thickness depends on the level of shielding during the thermal disproportional reaction. The coating thickness is adjusted such that the thickness d of the coating subjected to the thermal disproportional reaction is equal to an integral multiple of the optical thickness $\lambda/4$ of the coating at a design wavelength $\lambda$.

Examples of the organic solvent include alcohols such as methanol, ethanol, 2-propanol, butanol, ethylene glycol, and ethylene glycol mono-n-propyl ether; aliphatic and alicyclic hydrocarbons such as n-hexane, n-octane, cyclohexane, cyclopentane, and cyclooctane; aromatic hydrocarbons such as toluene, xylene, and ethylbenzene; esters such as ethyl formate, ethyl acetate, n-butyl acetate, ethylene glycol monomethyl ether acetate, ethylene glycol monoethyl ether acetate, ethylene glycol monobutyl ether acetate; ketones such as acetone, methyl ethyl ketone, methyl isobutyl ketone, and cyclohexanone; ethers such as dimethoxyethane, tetrahydrofuran, dioxane, and diisopropyl ether; chlorinated hydrocarbons such as chloroform, methylene chloride, carbon tetrachloride, and tetrachloroethane; and aprotic polar solvents such as N-methylpyrrolidone, dimethylformamide, dimethylacetoamide, and ethylene carbonate. In view of the stability of the coating solution, at least one of the alcohols may be used to prepare the coating solution.

The organic solvent is appropriately selected depending on a coating process used. When the evaporation rate of the organic solvent is extremely high, the coating is likely to be non-uniform. The use of a solvent with low vapor pressure is effective in improving the uniformity of the coating. After the coating is formed by applying the coating solution, which contains the fluorine-containing organic magnesium compound, to the base, the coating is heat-treated while being irradiated with beams of light, whereby a magnesium fluoride coating is formed. The FIGURE is a schematic view illustrating an example of a heat-treating step used herein. With reference to the FIGURE, reference numerals 11 to 14 represent the base (support), the coating, a heating unit, and the light beams, respectively.

The inventors have found that a coating of the fluorine-containing organic magnesium compound is converted into an MgF$_2$ coating at a temperature lower than usual thermal decomposition temperatures in such a manner that this coating is heat-treated while being irradiated with beams of light in the course of converting this coating into the MgF$_2$ coating by thermal decomposition.

In the course of thermally decomposing the fluorine-containing organic magnesium compound, heating causes the elimination of fluorine atoms and the eliminated fluorine atoms are replaced with magnesium-carboxyl group bonds. This probably produces magnesium fluoride. If the elimination of fluorine atoms can be readily caused by light irradiation, a disproportionate reaction probably proceeds at a lower temperature to create an MgF$_2$ coating.

The C—F bond energy is known to be 116 kcal/mol as described in R. D. Chambers, *Fluorine in Organic Chemistry*, John Willey & Sons, 1973, p. 5. The C—F bond energy is equal to the energy of a photon with a wavelength of 246 nm. The use of light with a wavelength less than 246 nm allows fluorine atoms to be eliminated.

A light source used herein for light irradiation preferably emits light with a wavelength of 246 nm or less, more preferably 10 nm to 185 nm, and further more preferably 150 nm to 185 nm. When ultraviolet rays emitted from the light source have a wavelength less than 150 nm, the ultraviolet rays attenuate before the ultraviolet rays reach the coating. Therefore, it is difficult to uniformly irradiate an optical component having an irregular shape with the ultraviolet rays. The light source can be a metal halide lamp, an excimer lamp, a deep ultraviolet lamp, or a low-pressure mercury lamp. In particular, the low-pressure mercury lamp can emit ultraviolet light with a wavelength down to 185 nm and therefore is useful in obtaining a metal fluoride by the elimination of fluorine atoms.

High-pressure mercury lamps cannot emit light with a wavelength less than 254 nm and therefore are incapable of cleaving C—F bonds. In the present invention, the irradiation of ultraviolet light and heat treatment are performed in combination; hence, the fluorine-containing organic magnesium compound can be decomposed at a temperature lower than a usual thermal decomposition temperature, whereby the MgF$_2$ coating is obtained.

The term "usual thermal decomposition temperature" as used herein refers to a temperature at which the fluorine-containing organic magnesium compound can be thermally decomposed only by heat and represents an exothermic peak due to thermal decomposition as observed by thermogravimetry-differential thermal analysis (TG-DTA) and/or a point of infection in weight reduction.

The decomposition of the fluorine-containing organic magnesium compound can be promoted by light irradiation. In the case of performing no light irradiation, the fluorine-containing organic magnesium compound needs to be heated to 300° C. or higher. When the fluorine-containing organic magnesium compound is irradiated with light, the fluorine-containing organic magnesium compound is decomposed at a temperature of 200° C. or lower and thereby magnesium fluoride is produced.

In the present invention, the following process may be used: a process in which the temperature of heat treatment is 250° C. or lower and in which light with a wavelength of 185 nm or less is applied or a process in which the temperature of heat treatment is 200° C. or lower and in which light with a wavelength of 185 nm or less is applied. A heating unit used herein can be a known one such as a hot plate including a heating wire, an oven, a hot-air dryer, a vacuum dryer, or an infrared lamp. The heating time of the base is preferably five minutes to two hours and more preferably ten minutes to one hour. When the heating time of the base is less than five minutes, the temperature of the base is not sufficiently increased and therefore reaction efficiency is not increased. In this case, it is effective that the base is heated in advance of light irradiation and then irradiated with light.

In the present invention, various types of glass can be used to form the base. Examples of glass used herein include alkali-free glass, aluminosilicate glass, borosilicate glass, high-refractive index low-dispersion glass containing barium or a rare-earth element, and fluorine-containing low-refractive index glass. An antireflection coating according to an embodiment of the present invention is produced by the magnesium fluoride coating-producing method and has refractive index of 1.35 or less for d-line (a wavelength of 587 nm).

The antireflection coating is made of magnesium fluoride. Layers for imparting various functions may be provided on the antireflection coating. For example, a hard coat layer for increasing the hardness of the antireflection coating may be provided on the antireflection coating and an adhesive or primer layer for increasing the adhesion between the hard coat layer and a transparent base may be provided on the hard coat layer. A layer provided between the transparent base and the hard coat layer can have a refractive index that is between the refractive index of the transparent base and the refractive index of the hard coat layer.

The antireflection coating has a low refractive index. The single use of the antireflection coating or the use of the antireflection coating in combination with a multilayer coating in an optical element allows the optical element to have good antireflective properties. When the antireflection coating is located at the top of a multilayer structure, the multilayer structure has low interface reflection and enhanced oblique incidence properties because the antireflection coating has a low refractive index.

The antireflection coating is applicable to various optical elements such as camera lenses, binoculars, and display apparatuses and is also applicable to windowpanes.

EXAMPLES

The present invention is further described below in detail with reference to examples. The present invention is not limited to the examples.

Example 1

A soda lime glass substrate having a diameter of 30 mm and a thickness of 1 mm was ultrasonically cleaned in isopropyl alcohol and was then dried, whereby a glass substrate for coating was prepared. To one mass part of powdery magnesium available from Kishida Chemical Co., Ltd. and 18 mass parts of 1-butanol, 25 mass parts of trifluoroacetic acid ($CF_3COOH$) was gradually added, whereby magnesium was completely dissolved. A solution containing completely dissolved magnesium was filtered and was then vacuum-dried, whereby magnesium trifluoroacetate was obtained.

In 14 mass parts of isopropyl alcohol, one mass part of magnesium trifluoroacetate obtained as described above was dissolved, whereby a coating paint was prepared. After the coating paint was applied to the glass substrate by spin coating, the glass substrate was heat-treated at a temperature of 200° C. for ten minutes with a hot plate while the glass substrate was being irradiated with ultraviolet light with a wavelength of 185 nm using a low-pressure mercury lamp, PL16-110, available from SEN LIGHTS CORPORATION. A coating was thereby formed on the glass substrate.

The obtained coating was measured for refractive index with an ellipsometer. The refractive index thereof is shown in Table 1. The reaction temperature of the coating paint was measured with a thermogravimetry-differential thermal analyzer (TG-DTA), TG8120, available from Rigaku Corporation. The measurement results are shown in Table 1.

[Analysis of Refractive Index]

The refractive index of the coating was analyzed at a wavelength of 190 to 1,000 nm by polarimetry using a spectroscopic ellipsometer, M-2000D, available from J. A. Woollam Japan Co., Inc.

Example 2

A coating was prepared and evaluated in the same manner as that described in EXAMPLE 1 except that pentafluoropropionic acid ($CF_3CF_2COOH$) was used instead of trifluoroacetic acid.

Example 3

A coating was prepared and evaluated in the same manner as that described in EXAMPLE 1 except that heptafluorobutyric acid ($CF_3(CF_2)_2COOH$) was used instead of trifluoroacetic acid.

Example 4

A coating was prepared and evaluated in the same manner as that described in EXAMPLE 1 except that nonafluorovaleric acid ($CF_3(CF_2)_3COOH$) was used instead of trifluoroacetic acid.

Example 5

A coating was prepared and evaluated in the same manner as that described in EXAMPLE 1 except that undecafluorohexanoic acid ($CF_3(CF_2)_4COOH$) was used instead of trifluoroacetic acid.

Example 6

A coating was prepared and evaluated in the same manner as that described in EXAMPLE 1 except that 3,3,3-trifluoropropoinic acid ($CF_3CH_2COOH$) was used instead of trifluoroacetic acid.

Examples 7 to 12

Coatings were prepared and evaluated in the same manners as those described in EXAMPLES 1 to 6 except that glass substrates coated with coating paints were heated at 250° C. for ten minutes with a hot plate while the glass substrates were being irradiated with ultraviolet light.

Examples 13 to 18

Coatings were prepared and evaluated in the same manners as those described in EXAMPLES 7 to 12 except that a metal halide lamp was used to irradiate glass substrates coated with coating paints with ultraviolet light.

Examples 19 and 20

Coatings were prepared and evaluated in the same manner as that described in EXAMPLE 1 except that glass substrates coated with coating paints were heated for 20 or seven minutes with a hot plate while the glass substrates were being irradiated with ultraviolet light.

Comparative Examples 1 to 6

Coatings were prepared and evaluated in the same manner as that described in EXAMPLE 1 except that light irradiation was not performed. No set-to-touch coatings were formed under this condition.

Comparative Example 7

A coating was prepared and evaluated in the same manner as that described in EXAMPLE 1 except that heat treatment was not performed. No set-to-touch coating was formed under this condition.

Comparative Example 8

A coating was prepared and evaluated in the same manner as that described in EXAMPLE 1 except that a high-pressure mercury lamp, EX-250, available from Ushio Inc. was used to obtain ultraviolet light with a wavelength of 254 nm. No set-to-touch coating was formed under this condition.

COMPARATIVE EXAMPLE 9

A coating was prepared and evaluated in the same manner as that described in COMPARATIVE EXAMPLE 8 except that a glass substrate coated with a coating paint was heated at 250° C. No set-to-touch coating was formed under this condition.

TABLE 1

| | Fluorine-containing organic magnesium compounds | Reaction temperatures | Light sources | Heating conditions | Refractive indexes |
|---|---|---|---|---|---|
| Example 1 | $Mg(CF_3COO)_2$ | 266° C. | Low-pressure mercury lamp | 200° C. for 10 minutes | 1.29 |
| Example 2 | $Mg(CF_3CF_2COO)_2$ | 315° C. | Low-pressure mercury lamp | 200° C. for 10 minutes | 1.29 |
| Example 3 | $Mg(CF_3(CF_2)_2COO)_2$ | 339° C. | Low-pressure mercury lamp | 200° C. for 10 minutes | 1.29 |
| Example 4 | $Mg(CF_3(CF_2)_3COO)_2$ | 332° C. | Low-pressure mercury lamp | 200° C. for 10 minutes | 1.27 |
| Example 5 | $Mg(CF_3(CF_2)_4COO)_2$ | 338° C. | Low-pressure mercury lamp | 200° C. for 10 minutes | 1.25 |
| Example 6 | $Mg(CF_3CH_2COO)_2$ | — | Low-pressure mercury lamp | 200° C. for 10 minutes | 1.35 |
| Example 7 | $Mg(CF_3COO)_2$ | 266° C. | Low-pressure mercury lamp | 250° C. for 10 minutes | 1.24 |
| Example 8 | $Mg(CF_3CF_2COO)_2$ | 315° C. | Low-pressure mercury lamp | 250° C. for 10 minutes | 1.24 |
| Example 9 | $Mg(CF_3(CF_2)_2COO)_2$ | 339° C. | Low-pressure mercury lamp | 250° C. for 10 minutes | 1.24 |
| Example 10 | $Mg(CF_3(CF_2)_3COO)_2$ | 332° C. | Low-pressure mercury lamp | 250° C. for 10 minutes | 1.22 |
| Example 11 | $Mg(CF_3(CF_2)_4COO)_2$ | 338° C. | Low-pressure mercury lamp | 250° C. for 10 minutes | 1.21 |
| Example 12 | $Mg(CF_3CH_2COO)_2$ | — | Low-pressure mercury lamp | 250° C. for 10 minutes | 1.30 |
| Example 13 | $Mg(CF_3COO)_2$ | 266° C. | Metal halide lamp | 200° C. for 10 minutes | 1.29 |
| Example 14 | $Mg(CF_3CF_2COO)_2$ | 315° C. | Metal halide lamp | 200° C. for 10 minutes | 1.30 |
| Example 15 | $Mg(CF_3(CF_2)_2COO)_2$ | 339° C. | Metal halide lamp | 200° C. for 10 minutes | 1.30 |
| Example 16 | $Mg(CF_3(CF_2)_3COO)_2$ | 332° C. | Metal halide lamp | 200° C. for 10 minutes | 1.27 |
| Example 17 | $Mg(CF_3(CF_2)_4COO)_2$ | 338° C. | Metal halide lamp | 200° C. for 10 minutes | 1.25 |
| Example 18 | $Mg(CF_3CH_2COO)_2$ | — | Metal halide lamp | 200° C. for 10 minutes | 1.35 |
| Example 19 | $Mg(CF_3COO)_2$ | 266° C. | Low-pressure mercury lamp | 200° C. for 20 minutes | 1.29 |
| Example 20 | $Mg(CF_3COO)_2$ | 266° C. | Low-pressure mercury lamp | 200° C. for 7 minutes | 1.30 |
| Comparative Example 1 | $Mg(CF_3COO)_2$ | 266° C. | Not used | 200° C. | NG |
| Comparative Example 2 | $Mg(CF_3CF_2COO)_2$ | 315° C. | Not used | 200° C. | NG |
| Comparative Example 3 | $Mg(CF_3(CF_2)_2COO)_2$ | 339° C. | Not used | 200° C. | NG |
| Comparative Example 4 | $Mg(CF_3(CF_2)_3COO)_2$ | 332° C. | Not used | 200° C. | NG |
| Comparative Example 5 | $Mg(CF_3(CF_2)_4COO)_2$ | 338° C. | Not used | 200° C. | NG |
| Comparative Example 6 | $Mg(CF_3CH_2COO)_2$ | — | Not used | 200° C. | NG |
| Comparative Example 7 | $Mg(CF_3COO)_2$ | 266° C. | Low-pressure mercury lamp | Not heated | NG |
| Comparative Example 8 | $Mg(CF_3COO)_2$ | 266° C. | High-pressure mercury lamp | 200° C. | NG |
| Comparative Example 9 | $Mg(CF_3COO)_2$ | 266° C. | High-pressure mercury lamp | 250° C. | NG |

Note:
NG indicates that a coating is tacky because no disproportional reaction proceeds.

According to a method of producing a magnesium fluoride coating according to the present invention, an antireflection coating is obtained by low-temperature heat treatment. The antireflection coating has a good antireflection effect and a low refractive index and is made of magnesium fluoride. The antireflection coating is suitable for use in optical elements having antireflection performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-178332 filed Jul. 30, 2009, which is hereby incorporated by reference herein in its entirety.

What is claimed is:

1. A method of producing a magnesium fluoride coating, comprising:
    forming a coating by applying a solution containing a fluorine-containing organic magnesium compound represented by the following formula to a base;
    heat-treating the coating;
    irradiating the coating with a beam of light with a wavelength of 246 nm or less,
    wherein the heat-treating and the irradiating are performed in combination, so that the fluorine-containing organic magnesium compound is decomposed:

$$Mg(CF_3\text{—}X\text{—}COO)_2 \qquad (1)$$

wherein X represents a single bond or one of —$(CF_2)_n$—, —$(CH_2)_m$—, and —$CH_2CF_2$— that may have a substituent, where n and m each represent an integer of 1 to 4.

2. The method according to claim 1, wherein the temperature of the heat-treating step is 250° C. or lower and the coating is irradiated with a beam of light with a wavelength of 185 nm or less.

3. The method according to claim 1, wherein the temperature of the heat-treating step is 200° C. or lower and the coating is irradiated with a beam of light with a wavelength of 185 nm or less.

4. A method of producing an antireflection coating containing magnesium fluoride including the steps of the method according to claim 1.

5. The method according to claim 4, wherein the antireflection coating has a refractive index of 1.35 or less at a wavelength of 587 nm.

6. A method of producing an optical element comprising the antireflection coating produced by the method according to claim 4.

* * * * *